Patented June 15, 1943

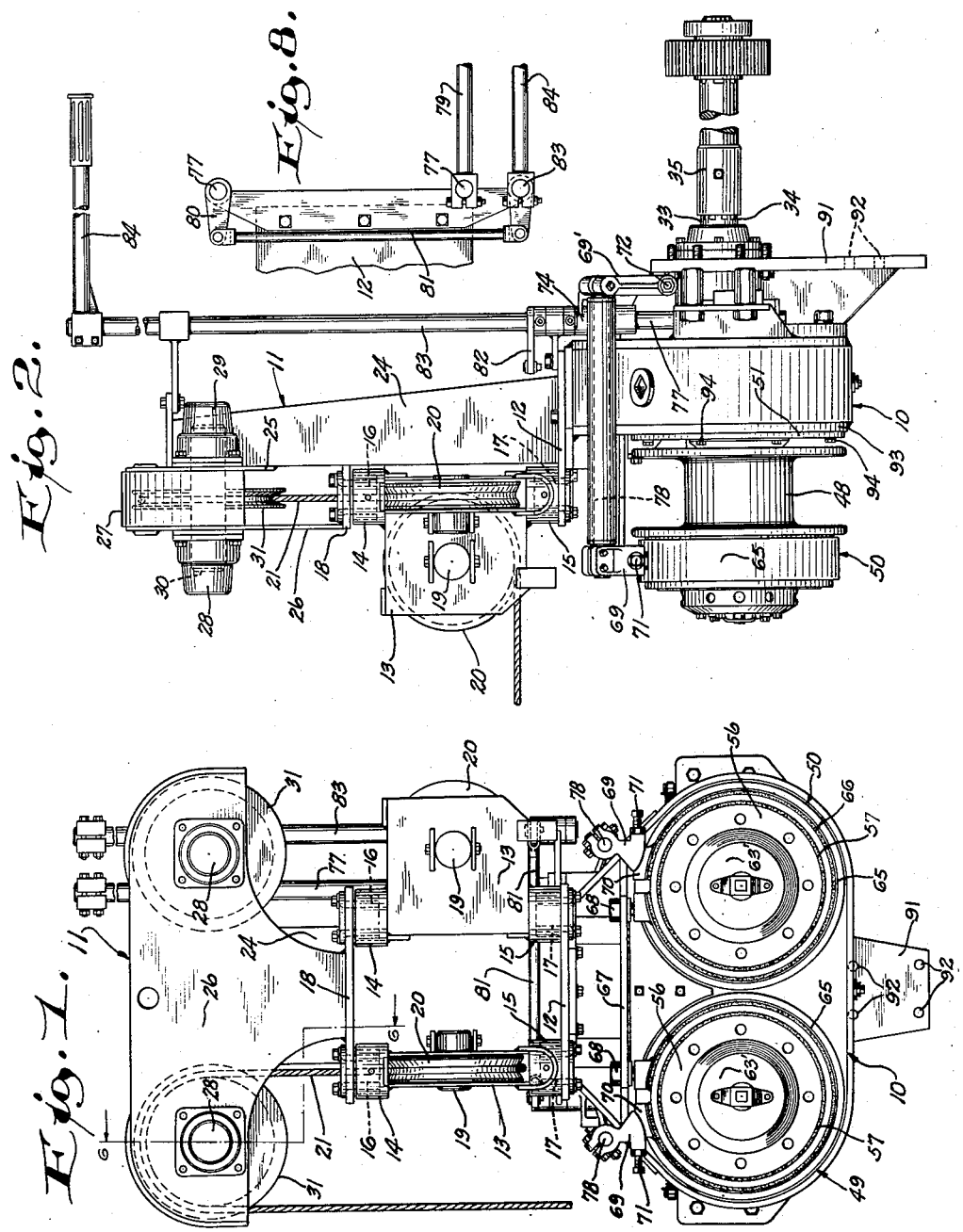

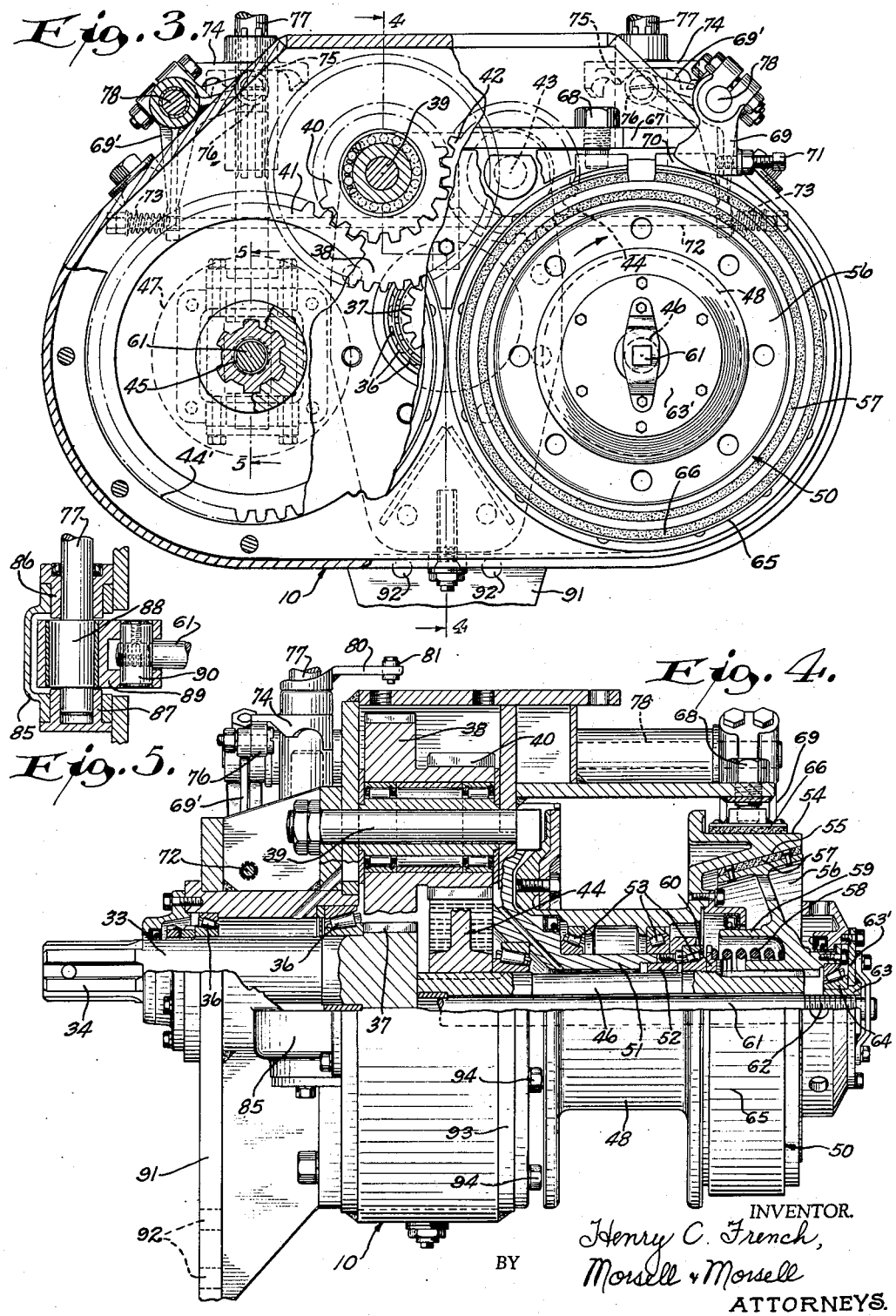

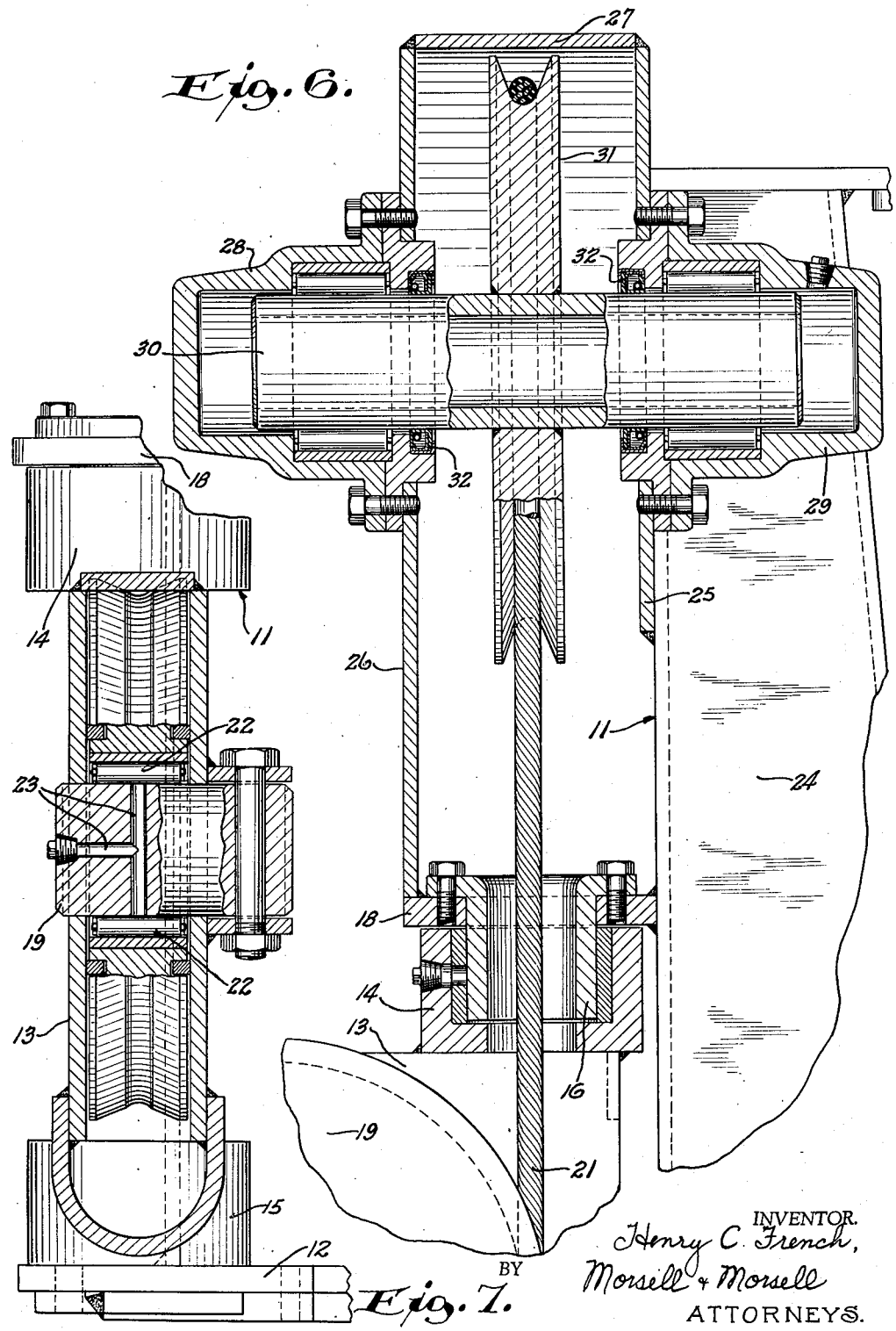

2,321,905

UNITED STATES PATENT OFFICE 2,321,905

WINCH ASSEMBLY

Henry C. French, Elm Grove, Wis., assignor to The Heil Co., Milwaukee, Wis., a corporation of Wisconsin Application May 5, 1941, Serial No. 391,955

3 Claims. (Cl. 254—187)

This invention relates to improvements in winch assemblies, and more particularly to a winch or power unit adapted to be mounted on a tractor whereby the tractor operator may control the operation of various elements of an implement, such as a scraper, which is connected to and moved by the tractor.

One of the objects of the present invention is to provide a double drum winch, which, although affixed to a portion of a tractor so as to receive its power from the power take-off shaft of the tractor, permits entire ready removal of the drum assembly for convenience in facilitating repairs and replacements.

A further object of the invention is to provide a winch assembly in which certain operating members are symmetrically arranged, permitting interchangeable mounting of the main driving gears to effect rotation of the winch drums in either direction, as desired.

A further object of the invention is to provide a winch assembly wherein portions of the housing are tied together with a tension member which prevents possible distortion of the winch housing.

A further object of the invention is to provide a power unit attachment for a tractor, said power unit including a clutch assembly which may be readily bodily removed from the power unit housing for convenience in repairs and replacements.

A further object of the invention is to provide a clutch equipped winch wherein the clutch is operated by a lever so arranged and connected that very little manual effort is required to manipulate it, with the clutch furthermore being extremely quick acting.

A further object of the invention is to provide a double drum winch assembly including an independent brake and drum for each winch but arranged and assembled so that the clutch and brake elements for each drum are identical and are interchangeable, and furthermore, identical application and release of power relative to both sets of clutch and brake members is at all times assured.

A further object of the invention is to provide a winch assembly wherein the cables are led to their respective winding drums by travelling supporting sheaves which insure proper and orderly winding of the cables on the drums.

A further object of the invention is to provide, in a winch assembly, a mounting for a cable guide sheave wherein the shaft on which the sheave is mounted is free to float back and forth longitudinally in bearing members in which lubricant is sealed, said bearing members being intercommunicating through the hollow shaft so that lubricant displaced from one bearing member, when the shaft shifts, flows into the other bearing member, maintaining at all times a constant volume of lubricant within the companion bearing members.

A further object of the invention is to provide a winch assembly which is of very simple construction, which is efficient in operation, which may be mounted on standard tractors in a manner to facilitate access to the internal mechanism for repairs, adjustments and replacements, which is strong and durable, and which is well adapted for the purposes described.

With the above and other objects in view the invention consists of the improved winch assembly and its parts and combinations as set forth in the claims, and all equivalents thereof.

In the accompanying drawings in which the same reference characters indicate the same parts in all of the views:

Fig. 1 is a rear end view of the improved winch assembly;

Fig. 2 is a side view thereof;

Fig. 3 is an enlarged rear view of the lower housed portion of the winch mechanism, with part thereof broken away and in section;

Fig. 4 is a view, taken on line 4—4 of Fig. 3 with additional parts broken away and partly in longitudinal section;

Fig. 5 is a fragmentary, detail sectional view taken on line 5—5 of Fig. 3;

Fig. 6 is an enlarged, fragmentary, sectional view taken on line 6—6 of Fig. 1 and showing the mounting of an upper guide sheave;

Fig. 7 is an enlarged, fragmentary, detail view, partly in vertical section, showing the mounting of a lower cable guide sheave; and Fig. 8 is a fragmentary plan view showing the operating handles and shafts and connections for the same.

Referring now more particularly to the drawings it will appear that the improved winch or power control unit is of the double drum type and includes a lower housing, designated generally by the numeral 10, and an upper framework or supporting structure, designated generally by the numeral 11. Certain driving gears and shafts are enclosed by the lower housing with which are also associated, cable winding drums, and brake and clutch mechanisms, all hereinafter to be described more in detail. The upper framework or supporting structure serves as mounting means for certain cable guiding sheaves, and other members.

The upper framework is separated from the lower housing by an intermediate, horizontal, supporting plate 12 on which is mounted in spaced relationship a pair of pivotal sheave enclosures 13, one of which is best shown in detail in Fig. 7. Each sheave enclosure has upper and lower trunnions 14 and 15 respectively, pivotal on tubular studs 16 and 17 projecting from an upper horizontal plate 18 and said lower plate 12. Each sheave enclosure has a transverse stud shaft 19 on which is rotatably mounted a lower cable guiding sheave 20. Each sheave enclosure, with its sheave, is free to pivot or turn on a vertical axis so as to swing its sheave to a position to aline with the member to which it is directing its cable 21. As shown in Fig. 1, the sheave enclosure 13 at the left is in one position, while the sheave enclosure at the right is turned at an angle of ninety degrees relative to the first-mentioned sheave enclosure. Roller bearings 22 are interposed between the sheaves 20 and their shafts 19, and the shafts are provided with lubricating ducts 23.

Projecting upwardly from the bottom plate 12 is a vertical supporting element 24 to a rear upper portion of which is affixed an upper sheave enclosure plate 25 spaced from another enclosure plate 26. The lower edge of the latter plate is welded to and supported on the intermediate horizontal plate 18. A top plate 27 closes the space between the vertical plates 25 and 26. The respective ends of the enclosure plates 25 and 26 carry alined bearing cups 28 and 29 (see Fig. 6) in which are journaled the end portions of longitudinally shiftable upper sheave shafts 30. An intermediate portion of each shaft 30 has fast thereon an upper sheave 31.

By reference to Fig. 6 it will be observed that a novel floating arrangement is provided for the upper sheave shafts 30. A shaft 30 is considerably shorter than the sum of the longitudinal dimensions of the members in which it is enclosed. Therefore, the shaft may shift back and forth longitudinally relative to the ends of its bearing cups 28 and 29. This is for the purpose of permitting the sheave 31 to ride back and forth to guide the cable 21 for orderly winding upon the drum to which it is directed. The cups 28 and 29 are adapted to be filled with a lubricant and the inner ends of the cups are sealed with packing strips 32. Also, the shaft 30 is tubular. Hence, if the shaft 30 floats toward the closed end of the bearing cup 29, for instance, lubricant therein will be displaced and will be forced through the tubular shaft to fill and occupy the additional space provided in the other cup 28 because of the shifting of the shaft. In this manner the lubricant, while sealed relative to the shaft and bearing cups, can flow so as to fill up spaces occasioned by longitudinal movements of the shaft, with the volume of the enclosed lubricant remaining at all times constant.

It should be noted that the bearing stud 16 at the bottom of the enclosure for an upper sheave 31 is tubular. Hence, the cable 21 extending downwardly from said upper sheave is passed through said tubular bearing stud and is directed about the corresponding lower guide sheave 19 from whence it extends to a proper instrumentality. The sheave 19, because of its mounting, is free to pivot on a vertical axis to aline itself properly with the desired direction of extent of the cable portion leading therefrom.

The lower housing 10 and other parts and mechanisms associated therewith are bolted to and depended from the lower horizontal plate 12. Extending from the forward end of the assembly inwardly into said housing is a horizontal drive shaft 33. An outwardly projecting portion of said shaft has a spline connection 34 with a coupling extension 35 by which means connection is made with the power take-off shaft of a tractor, as is usual. Portions of the shaft 33 within the housing are journaled in suitable roller bearings 36 and the inner portion of said shaft is formed with an integral pinion 37. Said pinion meshes with a large gear 38 mounted rearwardly on an upper stud shaft 39. Formed integrally with the large gear 38, and forwardly thereof, is a smaller gear 40 which meshes with a large drum shaft gear 41 and also with an idler gear 42 on a stud shaft 43. The idler gear 42 meshes with and transmits rotation at the desired speed to a second large drum shaft gear 44.

The gears 41 and 44 for the drum shafts are mounted fast on a pair of parallel and laterally separated drum shafts 45 and 46, said drum shafts being equi-distant from the drive shaft 33. Loose on the shafts 45 and 46, rearwardly of the gears 41 and 44, are drums 47 and 48 respectively, with the movement of the drums being controlled by clutch and brake members, indicated generally by the numerals 49 and 50 respectively.

As the structure and mounting of each drum and its respective clutch and brake member is the same as the other, only one set of the same will be described in detail. Between the drum 48 and the shaft 46 is a spindle extension 51, the latter being held to said shaft by a threaded retainer nut 52. Relatively large roller bearings 53 facilitate easy rolling movement of the drum on said spindle extension, and the retainer nut arrangement permits easy dismantling of this portion of the assembly. The rear head of the drum 48 has an extension forming an annular outer brake drum 54 and an inner, conical clutch surface 55.

Splined on the rear end portion of the main drum shaft 46 is a clutch drum 56 whose outer circular face is inwardly inclined to correspond with the drum clutch surface 55 and is positioned spacedly interiorly of the same. Said exterior face of the drum 56 carries a clutch band 57 of suitable braking material to frictionally engage the drum surface 55. A coiled spring 58 confined within a pocket in the hub portion 59 of the clutch drum and also engaging a nut 60 on the shaft 46, yieldingly urges the clutch drum axially on the shaft 46. The clutch is controlled by an elongated rod 61 which is longitudinally movably mounted within the hollow main drum shaft 46. One end of said rod connects with manual operating mechanism, later to be described. The right hand end of said rod, relative to Fig. 4, is threaded as at 62 and carries a cap 63 having a plate flange 63'. An inner portion of a bearing 64 is also fixed to said cap while the outer rotatable portion of said bearing abuts the outer end of the hub 59 of the clutch drum. Therefore, when the operating rod 61 is moved slightly in a direction to cause its outer end to pull inwardly on the cap 63 and bearing 64, the latter will push the clutch drum to the left relative to Fig. 4, causing the clutch band 57 to move sufficiently against the surface 55 to connect the drive as between the clutch drum and the cable drum. Conversely, when the operating rod 61 is moved longitudinally in the opposite direction, there will be a release of the driving engagement as between the drum 56 and the cable drum 48.

The brake member for the drum under consideration, comprises a brake shoe 65 carrying a brake band 66 substantially encircling the brake surface 54 of the cable drum 48. The ends of the brake band and shoe are separated from each other. One end of the shoe is made fast to a fixed bar 67 by a bolt 68. The other end of the brake band is fixed to a block 70 adjacent a pivotal lever arm 69. The degree of contact as between the lever arm 69 and the block may be regulated by an adjustable bolt 71. At the front of the assembly a bell-crank lever 69', which as will hereinafter appear moves with said lever arm 69, slides on an elongated transverse tie-rod 72 at each end of which there are confined coiled springs 73. Hence when the lever arm under consideration, as well as that on the other side of the housing, are moved in a direction to relieve pressure on their blocks 70 and consequently release the respective brake bands 66, the bell-crank levers 69' will move so as to compress the springs 73.

Expansion and contraction of the brake band 66 (and this is true of the companion brake band for the other cable drum) is controlled by a disc member 74 having a lower cam surface 75 on which a roller 76 on the other arm of the bell-crank lever 69' rides. The cam disc 74 is splined onto a portion of a vertical control shaft 77 which is at the front of the assembly. The lever arm 69 is connected with this vertical control shaft 77 through a forwardly extending horizontal rod 78 on whose forward end the bell-crank lever 69' is mounted fast, said rod 78 being turnable within its housing.

While each vertical control shaft 77 connects at its lower end with and extends upwardly from the forward end of its respective clutch control rod 61 it is not convenient from the standpoint of the operator of the tractor to have the upper manually actuated ends of said shafts 77 substantially separated. Hence, one of the shafts 77, as that for the right hand drum in Fig. 1, extends vertically upwardly from its clutch control rod 61 and its upper extremity is equipped with an operating handle 79. The other shaft 77 terminates immediately above the plate 12 and is provided with a horizontal arm 80 (see Fig. 8) to which is pivotally attached one end of a bar 81. Said bar 81 extends horizontally beyond the other shaft 77 and is pivotally connected with an end of an arm 82 whose other end is attached fast to a lower portion of an auxiliary control shaft 83 which is adjacent the first-mentioned shaft 77. The upper end of the auxiliary shaft 83 carries an operating handle 84. Thus, the accessible means for the manual operation and control of the two clutches and brakes are conveniently grouped.

The connection between the lower end of a vertical control shaft 77 and a clutch control rod 61 is shown in detail in Fig. 5. This connection is within the casing extension shown at 85 in Fig. 4 and includes therewithin upper and lower bearings 86 and 87. Intermediate the portions of the vertical control shaft 77 which are within the bearings 86 and 87 there is an eccentric portion 88 on said shaft which carries a block 89. An outer portion of said block is swiveled on a pin 90 to which is secured the end portion of the clutch control rod 61. When the operating handle 84 is turned, through the proper connections, a vertical control shaft 77 will turn, thereby operating the eccentric 88 and the block 89. This will impart longitudinal movement to the horizontal clutch control rod 61 to apply or release the clutch, depending on the direction of movement of said rod 61 and the operation of the clutch being accomplished in the manner previously described. Due to the eccentric 88, the leverage is in favor of the machine operator and very little manual effort is required to actuate the clutch. Also, the same is extremely quick acting.

The improved power unit is adapted to be mounted upon the rear portion of the transmission case of the tractor with which the power unit is to be associated. For this purpose the forward end portion of the assembly is provided with a flanged plate 91 formed with apertures 92 through which bolts (not shown) are extended. While the power unit is intended to be permanently mounted on the tractor transmission case it will be appreciated that for different tractors or for different implements it may become desirable to replace the power unit and the flange 91 and method of attachment facilitates this procedure. More generally, however, the assembly will not be removed from the tractor transmission casing, but the structure is such that all of the internal mechanism of the power unit is readily accessible and removable for repairs and replacements. For instance, by removing the plate 63' at the rear of the unit, access may be had to the clutch drum 56 which may be readily removed from its shaft 46. This gives access to the cable drum 48 which is likewise readily removable, or the bearings 53 therefor may be tightened by turning the nuts 60 and 52. It will therefore be seen that either or both of the entire cable drum assemblies are very readily removable, while the power unit is attached to the tractor, for repairs, adjustments, and replacement.

Another advantage of the structure is the ease with which the gears for the drum shafts may be removed, replaced, or interchanged. As was mentioned heretofore, the drum 48 is mounted on a spindle 51 and rotates thereon, the spindle being stationary. The spindle is, however, bolted to an annular flange 93 by bolts 94. When said bolts 94 are removed, an entire sub-assembly including the spindle 51, and the drum 48, are removable, affording access into the rear end of the housing 10. With this accomplishment the main drum shaft gear 44, the shaft 46, and the complete sub-assembly may be withdrawn axially for repairs or replacement.

This is possible in the present structure because each main gear 44 only meshes with one other gear thereabove and the opening 44' into the housing to permit removal of the gear 44 consequently only has to be sufficiently large to accommodate the gear 44.

The arrangement shown in the drawings, particularly Fig. 3, will result in one cable drum being driven in a predetermined direction and the other cable drum being driven in the opposite direction. It may be desirable to reverse the direction of rotation of the respective drums. With the present assembly this is very readily accomplished. It is only necessary to remove integral gears 38 and 40 from the shaft 39 and to remove gear 42 from its shaft 43. Then, gear 42 is replaced on shaft 39, and integral gears 38—40 are re-mounted on shaft 43. This is possible because of the symmetrical arrangement of the entire assembly and because the center lines of shafts 39 and 43 are equi-distant from the drive pinion 37 and are furthermore equi-distant from both drum shafts 61.

It will be observed that the shafts 39 and 43 are in the form of elongated bolts passing through flanges on both sides of the housing. These shafts serve to effectively tie all of the members together and act as tension devices to prevent housing distortion.

From the description heretofore given it must be obvious that operation of the several cable winding drums of the power unit is manually controlled by an operator adjacent the two operating handles 79 and 84, which turn the vertical control shafts 77 for the two main drum shafts. With reference to operation of one of the cable drums (the operation of the other being similar) let it be assumed that the operator manipulates the hand lever 79 in a certain direction to effect rotation of the drum 48 in a direction to wind the cable on said drum. With this condition existing, it is of course, essential that the clutch 56 for said drum be engaged and that the brake band 66 for said drum be released. The drum at the right, relative to Fig. 3, will turn, under these conditions, in the direction of the arrow. Engagement of the clutch 56 was effected through the means previously described, so power obtained from the transmission of the tractor, which is driving the main shaft 46, effects rotation of the drum 48. The brake 66, during this operation, is released because a projection on the cam surface 75 is engaging the roller 76 on the bell-crank lever 69' whereby the brake rod 78 has been turned in a direction to cause the arm 69 to move free of the block 70 at the end of the brake band. The brake band does not, therefore, bind on the drum brake surface 54 and the direction of rotation of said drum is contra to that which would cause binding of the brake band.

By moving the manipulating handle 79 to a neutral position, a situation may be obtained wherein the clutch 56 is engaged, but the brake is applied, whereby the cable being wound onto the drum is held rigidly. The position of the cam disc 74 and bell crank lever 69' is then as shown in Fig. 3. Eccentric 88 will have moved away from the position of Fig. 5.

A third position of operation, obtained through proper movement of the control handle 79, is that wherein the clutch is disengaged and the brake is released. When this condition exists, the clutch control rod 61 will have been moved to the clutch disengaging direction, and the eccentric 88 will have moved away from the position of Fig. 5 so as to disengage the clutch. Also, a projecting spot on the cam 75 will have moved the bell-crank lever 69' in a counterclockwise direction so as to effect release of the brake. With this condition attaining, the cable drum is free to turn and the cable may be played out.

From the foregoing description it will readily appear that the improved winch assembly or power unit is simple in operation and construction, the interior parts thereof are readily accessible for repairs and replacements, and the unit is well adapted for the purposes described.

What is claimed as the invention is:

1. In a power control unit, a hollow drum shaft, a drum freely rotatable relative thereto and having integral clutch and brake surfaces, a brake operatively mounted adjacent said drum brake surface, a clutch splined on the drum shaft and engageable and disengageable with said drum clutch surface, means for manually operating the brake and the clutch and including a connection extending through the drum shaft, and an eccentric member directly engaging one end portion of said connection minimizing the power needed to move the latter.

2. In a power control unit, a housing, a driven hollow drum shaft within the housing and extending out of one end thereof, means within the housing for transmitting rotation to said drum shaft, a fixed spindle through which an external portion of the drum shaft revolubly extends, an annular plate flange integral with an inner end portion of the spindle and closing an end portion of the housing, bolts removably securing said spindle flange to said housing end portion, a drum freely rotatably mounted on said spindle, anti-friction means between the spindle and drum, said drum having a cupped end head formed interiorly with a clutch surface and exteriorly with a brake surface, a clutch member splined on said drum shaft and yieldingly axially movable thereon and nested with the cupped end head of the drum for selective driving engagement with said clutch surface, a brake selectively engageable with said drum brake surface, a clutch operating rod extending through said drum shaft, and a retainer plate removably secured on the end portion of said rod and operatively engaging said clutch, release of said retainer plate and unbolting of the spindle plate flange permitting axial removal of the drum shaft and elements associated therewith including the clutch, the drum, the spindle, and some of the rotation transmitting means.

3. In a power control unit, a hollow drum shaft, a drum freely rotatable relative thereto and having clutch and brake surfaces, a brake operatively mounted adjacent said drum brake surface, a clutch on the drum shaft and engageable and disengageable with said drum clutch surface, means for manually operating the brake, a reciprocatable horizontal clutch control rod associated with said clutch, a revoluble vertical control shaft terminating adjacent one end of said rod, and an eccentric member forming a movable connection between the adjacent ends of the clutch control rod and the vertical control shaft minimizing the power required to move the clutch control rod.

HENRY C. FRENCH.